United States Patent [19]
Liebergeld

[11] 3,719,069
[45] March 6, 1973

[54] APPARATUS FOR CONVEYING AN ELONGATED WORKPIECE

[76] Inventor: Rudolf Liebergeld, Gernotstrasse 51-55, 85 Nurnberg, Germany

[22] Filed: Aug. 14, 1970

[21] Appl. No.: 63,784

[30] Foreign Application Priority Data

Aug. 16, 1969 Germany ..................... P 19 41 735.0

[52] U.S. Cl. ......................................... 72/427, 72/257
[51] Int. Cl. ......................... B21c 35/00, B21d 45/00
[58] Field of Search .............................. 72/427, 257

[56] References Cited

UNITED STATES PATENTS 3,214,958  11/1965  Muller ................................. 72/427
3,452,582  7/1969   Faymonville ........................ 72/427

*Primary Examiner*—Charles W. Lanham
*Assistant Examiner*—R. M. Rogers
*Attorney*—Holman & Stern

[57] ABSTRACT

An apparatus for conveying an elongated workpiece into or out of a press has an ejector and conveying grippers, the grippers being movable lengthwise of the die as well as transversely thereof; the movement of the gripper during ejection movement of the workpiece is related to and dependent upon the motion of the ejector.

3 Claims, 3 Drawing Figures

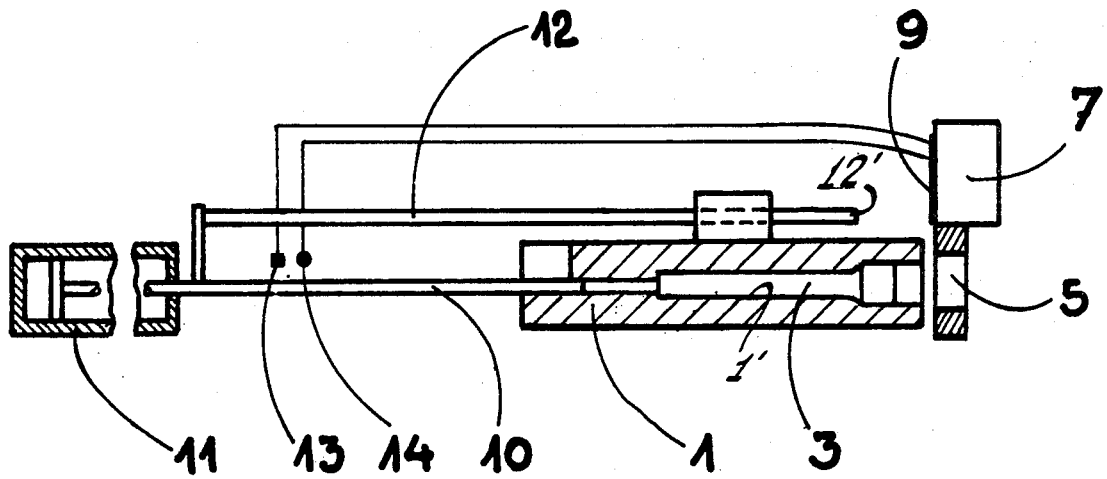

PATENTED MAR 6 1973

INVENTOR
Rudolf Liebergeld
BY Holman & Stern
ATTORNEYS

3,719,069

APPARATUS FOR CONVEYING AN ELONGATED WORKPIECE

BACKGROUND OF THE INVENTION

The invention relates to apparatus for conveying an elongated workpiece into and out of the die of a press to form the work-piece, the apparatus having a press ram, an ejector displaceable into the die and a conveying gripper, arranged in front of a front end of the die which is movable in a direction transverse to the direction of the length of the die and whereof the movement and actuation is controllable.

DESCRIPTION OF PRIOR ART

In one known apparatus for the cold or hot forming of workpieces, the workpieces, after ejection from a die, are gripped in one or more press stages simultaneously at an end opposed to the die by a set of conveying grippers and transported further in this condition. In the forming of long workpieces, a large number of difficulties are encountered in gripping the workpieces securely in the conveying grippers and guiding them directly into the die. In long workpieces which have different diameters, it is possible that they will be displaced into an oblique position, out of alignment with the discharge direction, during the ejection procedure, so that a reliable gripping, i.e., clamping by the conveying grippers is no longer ensured.

FIELD OF THE INVENTION

An object of the invention is to provide an apparatus of the above defined type in which, even with long workpieces, reliable transfer to and from a die can be achieved with reliable gripping by the conveying gripper.

To this end, the invention provides an apparatus of the above defined type characterized in that the conveying gripper is movable in the direction of the length of the die, and at least a partial stroke of the conveying gripper engaging the workpiece takes place during the discharge motion of the workpiece, and the control of gripping by the conveying gripper is dependent upon the discharge movement of the ejector.

In one embodiment of the apparatus according to the invention, an elongated workpiece being transported is gripped at one end by the conveying gripper. It is also guided in the conveying gripper during discharge from the die, or during introduction into the conveying gripper. By this means, an oblique disposition of the elongated workpiece in the conveying gripper is avoided and the entry of the long workpiece into the die is improved. The apparatus according to the invention is suitable both for conveying a workpiece from one die to another and also from a supply station, at which the workpiece is received for the purpose of transport to a die, and from a die to a discharge station at which the finished workpieces are removed from the conveying gripper.

In a preferred embodiment of the invention, a withdrawing motion of the conveying gripper encircling the workpiece is controlled in synchronization with the ejector. In this case, the workpiece, as soon as it projects partly from the die, is engaged by the conveying gripper which then moves in synchronization with the ejector. The synchronization with the ejector prevents the occurrence of a forced longitudinal displacement of the workpiece within the conveying gripper which may result from a more rapid movement of the ejector with respect to the conveying gripper.

The synchronization between the movement of the ejector and the movement of the conveying gripper may be effected by a direct mechanical transmission of the ejector movement to the conveying gripper in the direction towards the press ram. In a multi-stage press with ejectors controlled and moved in unison, it is advantageous if the control of gripping by the conveying grippers proceeds independently and is adjusted individually for each conveying gripper independent of the withdrawal stroke, whereby the conveying grippers are part of a single delivery device that is movable as a whole.

It is often advisable, where simultaneous withdrawing motion and clamping occurs, for each conveying gripper to have an individual withdrawal carriage and the withdrawal motion of each withdrawal carriage to be controlled independently of the withdrawal motion of the other withdrawal carriages. The commencement of the respective carriage motions and the strokes on the respective withdrawal carriages can then be decided for each conveying gripper individually.

A particularly advantageous improvement of the invention consists in that the discharge path of the ejector is shorter than the distance from the ejector to the front edge of the die and an additional retracted lifting device acting on the conveying grippers is provided. The additional lifting device can operate mechanically, hydraulically or pneumatically.

This solution makes possible the employment of shorter ejectors by which the end of the workpiece is not ejected up to the upper edge of the die. These are rendered significantly more stable and durable by the shortening of the ejectors. The shorter ejectors also serve to release the workpiece from the clamping die. During this releasing procedure, i.e., as long as the workpieces are being correctly guided by the shape of the die, the clamping of the workpiece by the conveying gripper may occur. On completion of the discharge stroke, the workpiece will, however, remain partially within the die, but is released from the clamping effect of the die. If the discharge stroke itself has ended, then an additional withdrawal stroke begins which, by means of the additional drive mechanism, continues the gripper motion by hydraulic or pneumatic control until the workpieces are completely removed from the vicinity of of the die.

Preferably, the conveying grippers remain in an inoperative position during the release stroke of the ejector. After the workpiece is wholly or for the most part, free of contact with the die, there occurs the withdrawal movement of the withdrawal carriage, separately controllable for each individual stage by means of mechanical-hydraulic or pneumatic actuation independent of the press ejector motion.

In order to introduce the workpiece into a die, the conveying gripper is moved in the direction of the injector either by hydraulic or pneumatic control or mechanically by means of rams or under the control of the ejector. In this case, the entire feed motion, or only second stage of the feed motion of the conveying gripper may be controlled, for example, mechanically in synchronization with the press ram or with the retraction motion of the ejector. Preferably, during entry of the workpiece, the conveying gripper is initially movable independently of the movement of the press ram and then in synchronization with the press ram or ejector and conveying gripper.

BRIEF DESCRIPTION OF THE DRAWINGS

Embodiments of the invention are diagrammatically illustrated in the drawing in which:

FIG. 1 is a side elevation of an apparatus for conveying an elongated workpiece, FIG. 2 is a plan view of the apparatus shown in FIG. 1, and FIG. 3 is a view on the line III—III in FIG. 2.

The apparatus shown in FIGS. 1 to 3 has two dies 1 and 2 having elongated bores 1' and 2' in which a workpiece 3 can be deformed by means of press rams (not shown). The workpiece is of non-uniform diameter. Both dies 1, 2 are rigidly interconnected one with the other and also with a discharge station 4. The dies 1, 2 and the discharge station 4 are arranged adjacent each other.

In front of each die 1, 2 is arranged a conveying gripper 5, 6 each of which is connected to an actuating device 7. The conveying grippers 5, 6 and actuating device 7 are of known construction, and will not therefore be further described. Both the actuating devices 7, together with a hydraulic unit 8, are arranged on a support 9, the hydraulic unit being secured to the support and both the conveying grippers 5, 6 together with the actuating devices 7 being transversely displaceable so that the one conveying gripper 5 can optionally stand in front of one or both dies and the other conveying gripper 6 optionally in front of the one die 2 or the discharge station 4. The conveying grippers 5, 6, the actuating devices 7, the hydraulic unit 8 and the support 9 together form a feed mechanism 17.

At the side opposed to the conveying grippers 5, 6, there extends into each die, 1, 2, an ejector 10, 10a which can be reciprocated by means of ejector hydraulic means 11, 11a. If the ejectors 10 are shifted to the right, then the workpiece 3 is pushed out of the dies 1, 2. Rigidly connected to each ejector 10, 10a is a connecting rod 12, 12a which is guided by one of the two dies 1, 2 and has a free end 12', 12'a terminating at the support 9. The connecting rod 12, 12a is separate from the support 9 and its free end 12, 12'a is spaced from the support when the ejector 10, 10a is retracted by means of the ejector hydraulic means 11, 11a.

For each ejector 10, 10a there is provided an electric contact 13, 14 which in each case is connected with one of the two actuating devices 7. The two contacts 13, 14 are differently spaced from their respective dies 1, 2 and are each actuated by the junction point between the ejector 10, 10a and the connecting rod 12, 12a when the ejector is pushed to the right. Finally, there is provided between the two dies 1, 2, a hydraulic retracting device 15 which is connected by means of a rod 16 with the support, the connection being rigid axially of the rod and displaceable transverse of the rod.

If the two equal length ejectors 10, 10a are pushed forwardly by means of the two hydraulic ejector mechanisms 11, 11a then the workpieces 3 present in the dies 1, 2 will be released and pushed partly between the conveying grippers 5, 6. When the connecting rods 12, 12a push against the support 9, a contact 13 is first actuated and shortly thereafter the other contact 14 so that the one conveying gripper 5 closes and grips at commencement of the stroke of the carrier and the other conveying gripper 6 closes and grips shortly after this commencement. If the workpiece 3 is pushed completely out of the dies by means of the ejectors 10 and conveying grippers 5, 6, then the hydraulic unit 8 is actuated. By this means, the one conveying gripper 6 is pushed over the discharge station 4 and the other conveying gripper 5 over the second die. To retract the conveying grippers 5, 6 in order to insert the workpiece in these positions, the hydraulic retracting mechanism is actuated. If the workpiece is pushed into the dies or onto the discharge station 4 by means of the conveying grippers 5, 6 or press rams (not shown) then the opened conveying grippers are again pushed over the two dies 1, 2 by means of the hydraulic unit 8.

Having thus described my invention what I claim as new and desire to secure by Letters Patent is:

1. Apparatus for feeding an elongated workpiece into and out of an elongated bore in a die of a press, said apparatus comprising an ejector mounted for sliding movement within the elongated bore, means for moving the ejector in the bore, a workpiece gripper, means for effecting transverse movement of the gripper relative to the die, a support mounting the gripper in front of the die, and a connecting rod for effecting longitudinal movement of the support and the gripper away from the die, said connecting rod being disposed adjacent the die and being rigidly connected with the ejector so as to be spaced from the support when the ejector is in a retracted position but to contact and move the support during part of the movement of the ejector into the bore during a workpiece ejection movement.

2. The apparatus according to claim 1, for a multistage press with several dies, in which an ejector and a gripper are provided for each die, the grippers being mounted on a common support, and a contact for actuating gripper movement of each gripper is disposed to be operated by the ejector moving means, the contacts being operated at different positions of the respective ejectors.

3. Apparatus for feeding an elongated workpiece into and out of an elongated bore in a die of a press, comprising an ejector mounted for reciprocating movement within the elongated bore, means for reciprocating the ejector, a workpiece gripper, means for effecting transverse movement of the gripper relative to the die, a support mounting the gripper in front of the die, and a connecting rod for effecting longitudinal movement of the support and the gripper away from the die, said connecting rod being disposed adjacent the die and being rigidly operably connected with the ejector moving means so as to be spaced from the support when the ejector is in a retracted position but to contact and move the support during part of the movement of the ejector into the bore during a workpiece ejection movement.

* * * * *